Oct. 24, 1933.  E. L. GOLTRY  1,932,340
STEERING KNUCKLE
Filed April 15, 1932
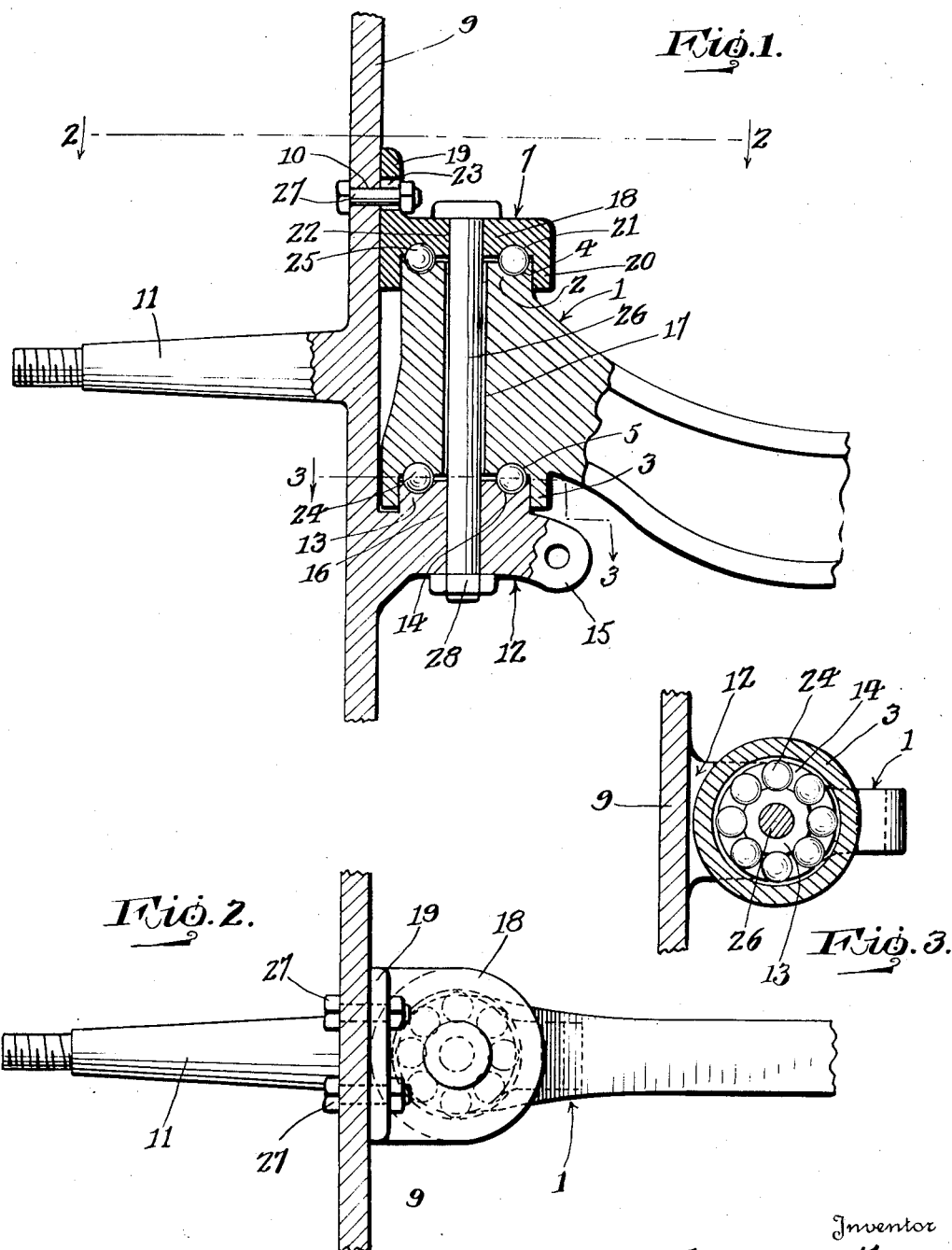
Inventor
Edwin L. Goltry
By Geo. P. Kimmel
Attorney Patented Oct. 24, 1933

1,932,340

UNITED STATES PATENT OFFICE 1,932,340

STEERING KNUCKLE

Edwin L. Goltry, Red Oak, Iowa

Application April 15, 1932. Serial No. 605,530

4 Claims. (Cl. 280—96.1)

This invention relates to a steering knuckle for automotive vehicles, and has for its object to provide, in a manner as hereinafter set forth, a structure of the class referred to including a wheel spindle, brake housing and an axle supporting bracket of one casting.

A further object of the invention is to provide, in a manner as hereinafter set forth, a structure of the class referred to including a casting consisting of an axle supporting bracket integral with a brake housing, a wheel spindle integral with the latter axially thereof and with the bracket so constructed and arranged to support bearing elements for the axle retained in position by the latter and for coupling to the connecting rod of the steering mechanism of the vehicle.

A further object of the invention is to provide, in a manner as hereinafter set forth, a structure of the class referred to including a horizontally shiftable brake housing having integral therewith a wheel spindle.

A further object of the invention is to provide, in a manner as hereinafter set forth, a structure of the class referred to for supporting one end of an axle of the vehicle from a brake housing and to prevent the vertical movement of such end relative to the housing.

A further object of the invention is to provide, in a manner as hereinafter set forth, a structure of the class referred to having a wheel spindle carried by a brake housing and upper and lower bearings for an axle end and with bearing confining means on the housing and the axle end, and with the bearing confining means on the housing preventing the axle end of shifting vertically relative to the housing.

Further objects of the invention are to provide, in a manner as hereinafter set forth, a steering knuckle which is simple in its construction and arrangement, strong, durable, compact, thoroughly efficient in its use, readily assembled and comparatively inexpensive to manufacture.

To the above ends essentially and others which may hereinafter appear, the invention consists of such parts, and such combination of parts which fall within the scope of the invention as claimed.

In the drawing:

Figure 1 is a vertical sectional view illustrating a steering knuckle structure in accordance with this invention.

Figure 2 is a section on line 2—2 Figure 1.

Figure 3 is a section on line 3—3 Figure 1.

Referring to the drawing, 1 indicates generally an end terminal portion of an axle of a vehicle formed at its top with a circular extension 2 and at its bottom with a depending circular collar 3 of greater diameter than the extension 2. The upper face of the latter is provided with an annular groove 4 of semi-circular cross section which forms a ball race. The lower face of portion 1 is formed with an annular groove 5 of semi-circular cross section which provides a ball race. The collar 3 surrounds and is spaced from groove 5. The end edge 6 of portion 1 extends from a point removed from the bottom of the latter to extension 2 upon an inset curve to provide a clearance for a vertically adjustable element 7 to be hereinafter referred to.

The steering knuckle structure also includes in connection with the structural features referred to in the preceding paragraph, a casting including the back plate 9 of a brake housing. The plate 9 is provided with a pair of spaced horizontally aligning openings 10 spaced above the axis thereof, an outwardly directed wheel spindle 11 integral with one side and extending from its axis and an inwardly directed supporting bracket 12 integral with its other side below its axis. The bracket is arranged below the spindle 11 and is formed at its top with a circular extension 13 having its upper face provided with an annular groove 14 of semi-circular cross section forming a ball race opposing the ball race provided by the groove 5. The bracket 12 has extended therefrom a rearwardly directed downwardly curved apertured lug 15 for attaching thereto one end of the connecting rod, not shown of the steering mechanism, not shown of the vehicle. The bracket 12 is formed centrally with a vertical opening 16 which aligns with a vertical opening 17 provided in the portion 1 of the axle.

The element 7 is of cap form and consists of an angle shaped body part formed of a horizontal and a vertical leg 18, 19 respectively, the latter is extended upwardly from one end of the former. The leg 18 has its other end rounded. The lower face of leg 18 is formed with a depending circular collar 20 and an annular groove 21 which is surrounded by and spaced from the collar 20. The leg 18 is also formed with an opening 22 which aligns with opening 17. The groove 21 is of semi-circular cross section and provides a ball race which aligns with the ball race formed by the groove 4. The leg 19 is formed with a pair of spaced slots 23 which register with openings 10.

The structure further includes bearing balls 24 arranged in aligning grooves 5, 14. Bearing balls 25 are mounted in aligning grooves 4, 21. A combined coupling and headed pivot bolt 26 which extends through aligning openings 16, 17, 22. Detachable securing means 27 coacting with the openings 10 and slots 23 for anchoring element 7 in its adjusted position, and a securing nut 28 for the bolt 26.

The element 7 prevents the vertical movement of the axle portion 1 relative to housing 9. The opening 17 is of greater diameter than that of bolt 26 to provide space for lubrication. The collars 3 and 20 encompass and snugly fit the extensions 2 and 13 respectively to confine or retain the balls 25 in their races and provide a dust and waterproof bearing, as well as prevent lubricant from escaping.

What I claim is:—

1. In a steering knuckle structure, the combination with an integral unit formed of a vertically disposed back plate of a brake housing, a wheel spindle integral at its inner end with and axially of the front face of said plate and an axle end supporting bracket integral with the rear face of the plate below the axis of the latter, said bracket being disposed at right angles to the plate and formed at its top with an upwardly directed circular extension, of an axle end retaining element secured to the rear face of the plate above the axis of and disposed at right angles to the plate, said element being formed with a depending annular collar, an axle end portion extended between said bracket and element, said end portion being formed at its top with an upstanding circular extension arranged in said collar and at its bottom with an annular collar encompassing the extension on the bracket, a pivot bolt extending through said element, bracket and axle end portion for pivotally connecting the latter with said plate, bearings interposed between the extension on the axle end portion and said element and bearing means interposed between the extension on the bracket and said axle end portion.

2. In a steering knuckle structure, the combination with an integral unit formed of a vertically disposed back plate of a brake housing, a wheel spindle integral at its inner end with and axially of the front face of said plate and an axle end supporting bracket integral with the rear face of the plate below the axis of the latter, said bracket being disposed at right angles to the plate and formed at its top with an upwardly directed circular extension, of a vertically adjustable axle end retaining element secured to the rear face of the plate above the axis of and disposed at right angles to the plate, said element being formed with a depending annular collar, an axle end portion extended between said bracket and element, said end portion being formed at its top with an upstanding circular extension arranged in said collar and at its bottom with an annular collar encompassing the extension on the bracket, a pivot bolt extending through said element, bracket and axle end portion for pivotally connecting the latter with said plate, bearings interposed between the extension on the axle end portion and said element, and bearing means interposed between the extension on the bracket and said axle end portion.

3. In a steering knuckle structure, the combination with an integral unit formed of a vertically disposed back plate of a brake housing, a wheel spindle integral at its inner end with and axially of the front face of said plate and an axle end supporting bracket integral with the rear face of the plate below the axis of the latter, said bracket being disposed at right angles to the plate and formed at its top with an upwardly directed circular extension, of an axle end retaining element secured to the rear face of the plate above the axis of and disposed at right angles to the plate, said element being formed with a depending annular collar, an axle end portion extended between said bracket and element, said end portion being formed at its top with an upstanding circular extension arranged in said collar and at its bottom with an annular collar encompassing the extension on the bracket, a pivot bolt extending through said element, bracket and axle end portion for pivotally connecting the latter with said plate, bearings interposed between the extension on the axle end portion and said element, and bearing means interposed between the extension on the bracket and said axle end portion, the collars on said element and axle end portion and the extension on said bracket and axle end portion being spaced from the rear face of said plate.

4. In a steering knuckle structure, the combination with an integral unit formed of a vertically disposed back plate of a brake housing, a wheel spindle integral at its inner end with and axially of the front face of said plate and an axle end supporting bracket integral with the rear face of the plate below the axis of the latter, said bracket being disposed at right angles to the plate and formed at its top with an upwardly directed circular extension, of a vertically adjustable axle end retaining element secured to the rear face of the plate above the axis of and disposed at right angles to the plate, said element being formed with a depending annular collar, an axle end portion extended between said bracket and element, said end portion being formed at its top with an upstanding circular extension arranged in said collar and at its bottom with an annular collar encompassing the extension on the bracket, a pivot bolt extending through said element, bracket and axle end portion for pivotally connecting the latter with said plate, bearings interposed between the extension on the axle end portion and said element, and bearing means interposed between the extension on the bracket and said axle end portion, the collars on said element and axle end portion and the extension on said bracket and axle end portion being spaced from the rear face of said plate.

EDWIN L. GOLTRY.